United States Patent
Sassa et al.

(10) Patent No.: US 11,709,263 B2
(45) Date of Patent: Jul. 25, 2023

(54) OBJECT DETECTOR

(71) Applicant: AISIN CORPORATION, Kariya (JP)

(72) Inventors: Koichi Sassa, Kariya (JP); Ippei Sugae, Kariya (JP)

(73) Assignee: AISIN CORPORATION, Kariya (JP)

( * ) Notice: Subject to any disclaimer, the term of this patent is extended or adjusted under 35 U.S.C. 154(b) by 64 days.

(21) Appl. No.: 17/202,706

(22) Filed: Mar. 16, 2021

(65) Prior Publication Data

US 2021/0389455 A1    Dec. 16, 2021

(30) Foreign Application Priority Data

Jun. 12, 2020  (JP) ................. 2020-102595

(51) Int. Cl.
| | | |
|---|---|---|
| *G01S 15/04* | (2006.01) | |
| *G01S 15/46* | (2006.01) | |
| *G01S 15/58* | (2006.01) | |
| *G01S 15/931* | (2020.01) | |

(52) U.S. Cl.
CPC .............. *G01S 15/04* (2013.01); *G01S 15/46* (2013.01); *G01S 15/58* (2013.01); *G01S 15/931* (2013.01); *G01S 2015/465* (2013.01)

(58) Field of Classification Search
None
See application file for complete search history.

(56) References Cited

U.S. PATENT DOCUMENTS

| | | | | |
|---|---|---|---|---|
| 5,252,980 A | * | 10/1993 | Gray ............... | G01S 13/003 342/107 |
| 10,386,495 B1 | * | 8/2019 | Zhu ............... | G01S 19/396 |
| 2008/0018526 A1 | * | 1/2008 | Wade .............. | G01S 13/282 342/204 |
| 2013/0113647 A1 | * | 5/2013 | Sentelle ........... | G01V 3/12 342/22 |
| 2016/0116441 A1 | | 4/2016 | Fukuman et al. | |

(Continued)

FOREIGN PATENT DOCUMENTS

| | | | | |
|---|---|---|---|---|
| JP | 2015-004562 A | 1/2015 | | |
| JP | 2016-080648 A | 5/2016 | | |
| WO | WO-2015017670 A2 * | 2/2015 | ........... | G01S 5/18 |

*Primary Examiner* — Isam A Alsomiri
*Assistant Examiner* — Vikas Atmakuri
(74) *Attorney, Agent, or Firm* — Sughrue Mion, PLLC (57) ABSTRACT

An object detector includes: a triangulation calculation unit that performs triangulation calculation for detecting a location of an object based on first distance information calculated based on direct waves in which transmitted waves transmitted from a first transmission and reception unit are reflected by an object and received by the first transmission and reception unit, and second distance information calculated based on indirect waves in which transmitted waves transmitted from a second transmission and reception unit arranged in a location different from the first transmission and reception unit are reflected by an object and received by the first transmission and reception unit; and a prohibition processing unit that prohibits triangulation calculation when a difference between first velocity information indicating a velocity of an object calculated based on the direct waves and second velocity information indicating a velocity of an object calculated based on the indirect waves exceeds a predetermined range.

4 Claims, 10 Drawing Sheets

(56) References Cited

U.S. PATENT DOCUMENTS

| | | | |
|---|---|---|---|
| 2018/0364327 A1* | 12/2018 | Weldum | G01S 13/91 |
| 2020/0142029 A1* | 5/2020 | Brooker | G01S 13/87 |
| 2020/0209388 A1* | 7/2020 | Ding | G01S 15/104 |
| 2021/0011146 A1* | 1/2021 | Bialer | G01S 13/343 |
| 2021/0356583 A1* | 11/2021 | Kutomi | G01S 15/101 |
| 2022/0113404 A1* | 4/2022 | Koyama | G01S 15/586 |

* cited by examiner

OBJECT DETECTOR

CROSS REFERENCE TO RELATED APPLICATIONS

This application is based on and claims priority under 35 U.S.C. § 119 to Japanese Patent Application No. 2020-102595, filed on Jun. 12, 2020, the entire content of which is incorporated herein by reference.

TECHNICAL FIELD

This disclosure relates to an object detector.

BACKGROUND DISCUSSION

In a device that detects an object by transmitting transmitted waves such as ultrasonic waves and millimeter waves and receiving reflected waves from the object, a technique of detecting the location of the object by using triangulation calculation is used.

For example, in a system that uses long-distance sensors, a configuration is disclosed in which multiple two-sensor combinations are set and triangulation calculation is performed for each combination to prevent detection of a location (virtual image) where an object does not actually exist (Japanese Patent Application Publication No. 2015-4562).

The above triangulation calculation can be performed by using direct waves and indirect waves acquired by multiple sensors (transmission and reception units) arranged in different locations. Direct waves are reflected waves in which transmitted waves transmitted from a first transmission and reception unit is reflected by an object and received by the first transmission and reception unit. Indirect waves are reflected waves in which transmitted waves transmitted from a second transmission and reception unit arranged in a location different from that of the first transmission and reception unit are reflected by an object and received by the first transmission and reception unit. However, when there are multiple objects, or when the objects are moving relative to one another, for example, the object corresponding to the direct waves and the object corresponding to the indirect waves are different, and a virtual image is more likely to be detected as a result of the triangulation calculation.

A need thus exists for an object detector which is not susceptible to the drawback mentioned above.

SUMMARY

An object detector as an example of this disclosure includes: a triangulation calculation unit that performs triangulation calculation for detecting a location of an object on the basis of first distance information calculated on the basis of direct waves in which transmitted waves transmitted from a first transmission and reception unit are reflected by an object and received by the first transmission and reception unit, and second distance information calculated on the basis of indirect waves in which transmitted waves transmitted from a second transmission and reception unit arranged in a location different from the first transmission and reception unit are reflected by an object and received by the first transmission and reception unit; and a prohibition processing unit that prohibits the triangulation calculation when a difference between first velocity information indicating a velocity of an object calculated on the basis of the direct waves and second velocity information indicating a velocity of an object calculated on the basis of the indirect waves exceeds a predetermined range.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of this disclosure will be described with reference to the drawings. The configuration of the embodiments described below, and the actions and effects brought about by the configuration are merely examples, and are not limited to the contents described below.

First Embodiment

Figure 1:
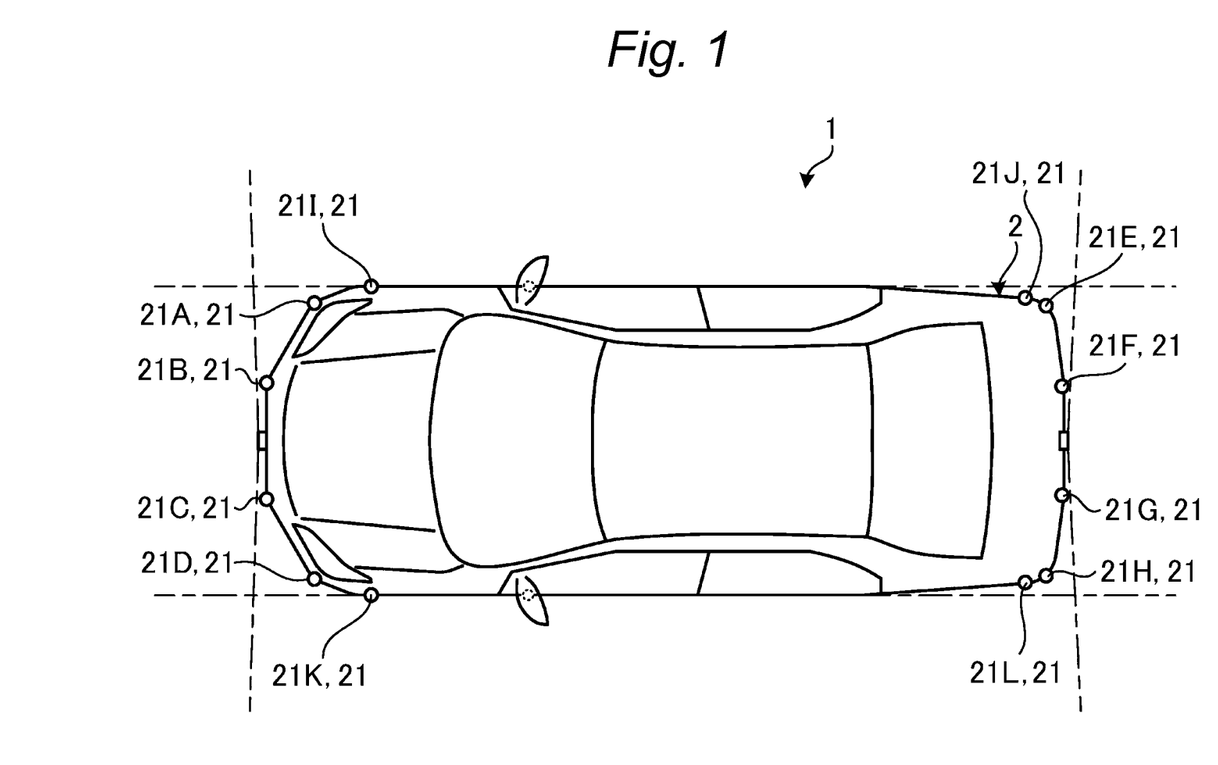
FIG. 1 is a top view showing an example of the appearance of a vehicle including a vehicle control system according to a first embodiment.

FIG. 1 is a top view showing an example of the appearance of a vehicle 1 including a vehicle control system according to a first embodiment. The vehicle control system is a system including an object detector that detects an object existing around the vehicle 1, an electronic control unit (ECU) that controls the vehicle 1 on the basis of the detection result of the object detector, and the like.

The object detector according to the present embodiment is a device that detects information (presence or absence of object, location of object, and the like) regarding an object (other vehicle, obstacle, person, or the like) existing around the vehicle 1 on the basis of time of flight (TOF) information acquired by transmitting transmitted waves such as ultrasonic waves from the vehicle 1 and receiving reflected waves from an object, Doppler shift information, and the like.

The object detector according to the present embodiment has multiple transmission and reception units 21A to 21L (hereinafter, these may be collectively referred to as transmission and reception unit 21). Each transmission and reception unit 21 is installed on a vehicle body 2 which is the exterior of the vehicle 1, transmits transmitted waves toward the outside of the vehicle body 2, and receives reflected waves from an object existing outside the vehicle body 2. In the example shown in FIG. 1, of the vehicle body 2, four transmission and reception units 21A to 21D are arranged on a front end portion, four transmission and reception units 21E to 21H are arranged on a rear end portion, two transmission and reception units 21I and 21J are arranged on a right side surface portion, and two transmission and reception units 21K and 21L are arranged on a left side surface portion. Note that the number and installation locations of the transmission and reception units 21 are not limited to the above example.

Figure 2:
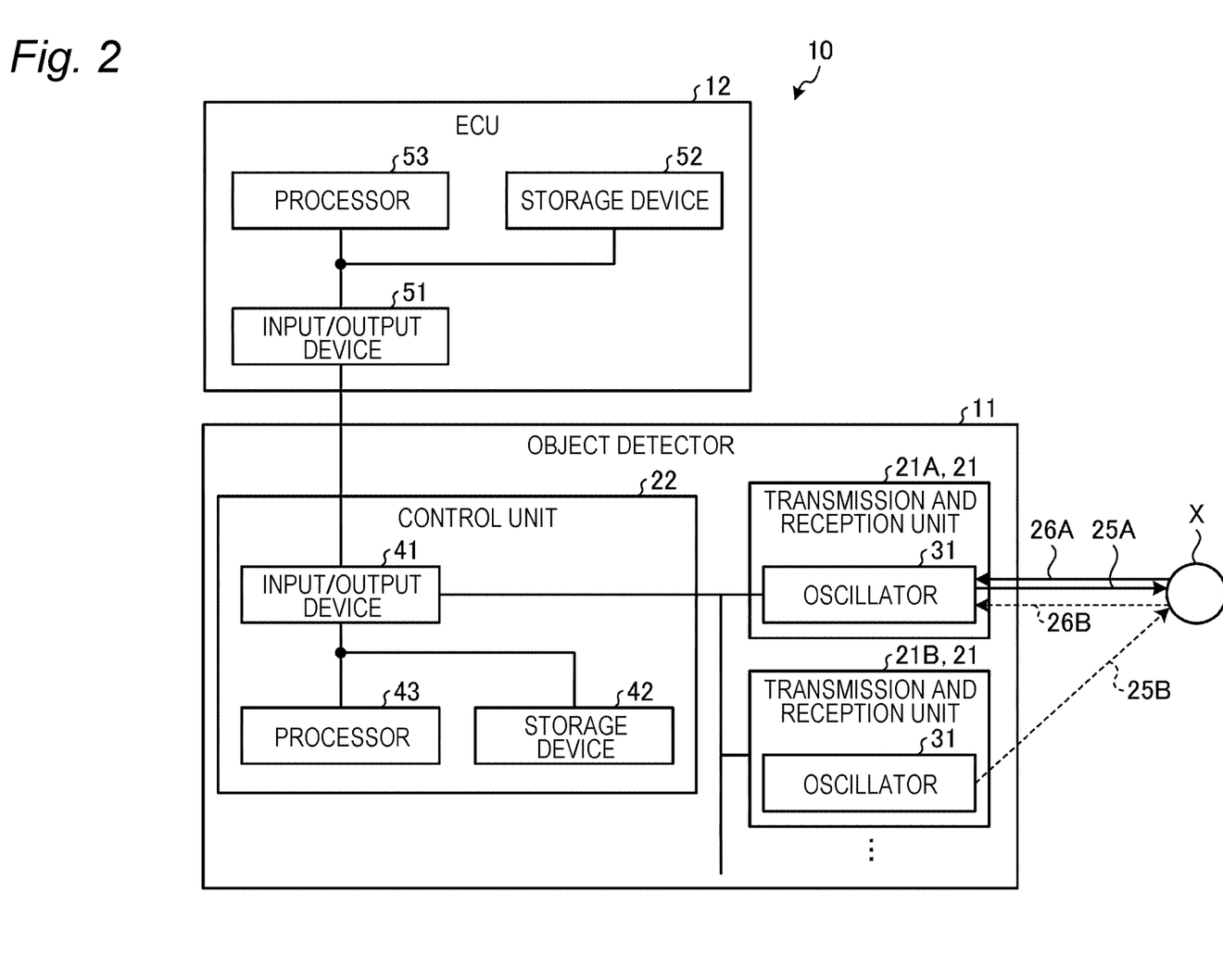
FIG. 2 is a block diagram showing an example of the hardware configuration of the vehicle control system according to the first embodiment.

FIG. 2 is a block diagram showing an example of the hardware configuration of a vehicle control system 10 according to the first embodiment. The vehicle control system 10 according to the present embodiment includes an object detector 11 and an ECU 12.

The object detector 11 has multiple transmission and reception units 21 and a control unit 22.

Each transmission and reception unit 21 illustrated in FIG. 2 has an oscillator 31 formed by using a piezoelectric element or the like, and achieves transmission and reception of ultrasonic waves by the oscillation of the oscillator 31. Specifically, each transmission and reception unit 21 transmits ultrasonic waves generated according to the oscillation of the oscillator 31 as transmitted waves, and the oscillation of the oscillator 31 caused by the reflected waves in which the transmitted waves are reflected by an object X is detected.

Each transmission and reception unit 21 can receive not only reflected waves corresponding to the transmitted waves transmitted by itself but also reflected waves corresponding to the transmitted waves transmitted by other transmission and reception units 21. For example, as shown in FIG. 2, the first transmission and reception unit 21A receives direct waves 26A being reflected waves in which transmitted waves 25A transmitted from the first transmission and reception unit 21A are reflected by the object X, and indirect waves 26B being reflected waves in which transmitted waves 25B transmitted from the second transmission and reception unit 21B are reflected by the object X. In order to make the direct waves 26A and the indirect waves 26B distinguishable, the transmitted waves are each subjected to appropriate identification processing (e.g., frequency modulation, phase modulation, or the like). TOF information indicating the distance to the object X, Doppler shift information indicating the velocity (relative velocity) of the object X, and the like can be acquired from each of the direct waves 26A and the indirect waves 26B.

Note that the relationship between the direct waves and the indirect waves is not limited to the above example. The first transmission and reception unit 21A may be configured to receive indirect waves from another transmission and reception unit 21 (e.g., third transmission and reception unit 21C, ninth transmission and reception unit 21I, or the like) physically located such that the first transmission and reception unit 21A can receive indirect waves from this other transmission and reception unit 21. Additionally, the reception of the indirect waves is not limited to the first transmission and reception unit 21A, and the other transmission and reception units 21B to 21L may also be configured to receive indirect waves. Additionally, while the example shown in FIG. 2 illustrates a configuration in which both transmission of the transmitted waves and reception of the reflected waves (direct waves and indirect waves) are performed using a single oscillator 31, the configuration of the transmission and reception unit 21 is not limited to this. The transmission side and the reception side may be separated, such as providing a separate first oscillator for transmitting transmitted waves and second oscillator for receiving reflected waves.

The control unit 22 includes an input/output device 41, a storage device 42, and a processor 43. The input/output device 41 is an interface device for achieving information transmission and reception between the control unit 22 and the outside (transmission and reception unit 21, ECU 12, and the like). The storage device 42 includes a main storage device such as a read only memory (ROM) and a random access memory (RAM), and an auxiliary storage device such as a hard disk drive (HDD) and a solid state drive (SSD). The processor 43 is an integrated circuit that performs various processing for implementing the functions of the control unit 22, and includes components such as a central processing unit (CPU) that operates according to a program, and an application specific integrated circuit (ASIC) designed for a specific application, for example. The processor 43 performs various arithmetic processing and control processing by reading and executing a program stored in the storage device 42.

The ECU 12 is a unit that performs various processing for controlling the vehicle 1 on the basis of various information acquired from the object detector 11 and the like. The ECU 12 has an input/output device 51, a storage device 52, and a processor 53. The input/output device 51 is an interface device for achieving information transmission and reception between the ECU 12 and the outside (object detector 11, drive mechanism, braking mechanism, steering mechanism, and the like). The storage device 52 includes a main storage device such as a ROM and a RAM, and an auxiliary storage device such as an HDD and an SSD. The processor 53 is an integrated circuit that performs various processing for implementing the functions of the ECU 12, and includes components such as a CPU and an ASIC, for example. The processor 53 reads a program stored in the storage device 52 and performs various arithmetic processing and control processing.

Figure 3:
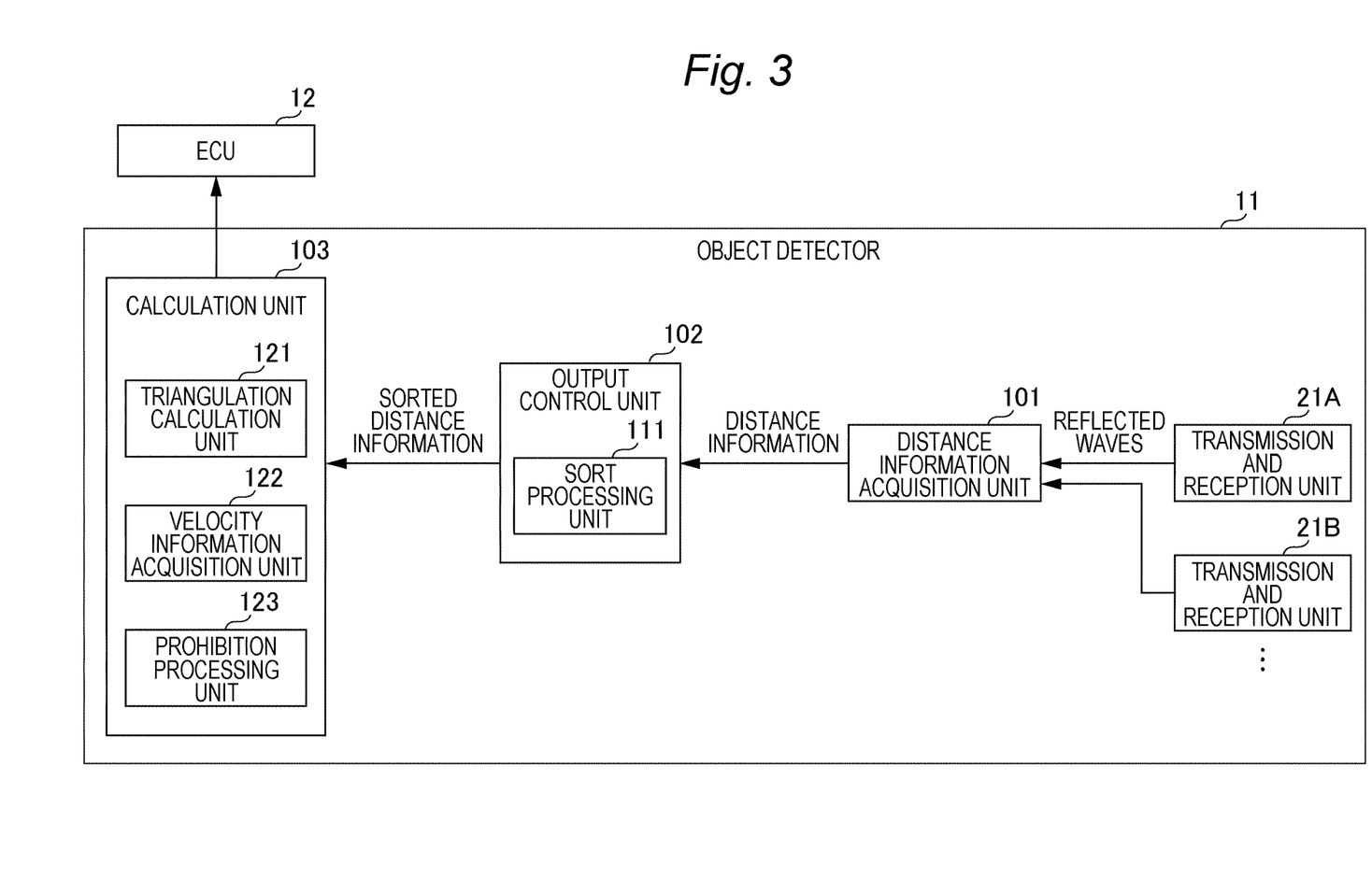
FIG. 3 is a block diagram showing an example of the functional configuration of an object detector according to the first embodiment.

FIG. 3 is a block diagram showing an example of the functional configuration of the object detector 11 according to the first embodiment. The object detector 11 has a distance information acquisition unit 101, an output control unit 102, and a calculation unit 103. Each of these functional units 101 to 103 is implemented by cooperation of the hardware components of the object detector 11 as shown in FIG. 2 and software elements such as a program.

The distance information acquisition unit 101 acquires distance information indicating the distance from the transmission and reception unit 21 to the object X on the basis of the change over time in the signal level (reception intensity) of the reflected waves (direct waves and indirect waves) received by each transmission and reception unit 21. Distance information is, for example, a TOF, a distance calculated from TOF, or the like. For example, the distance information acquisition unit 101 acquires a direct TOF that is a TOF calculated on the basis of the direct waves received by each transmission and reception unit 21, and an indirect TOF that is a TOF calculated on the basis of the indirect waves received by each transmission and reception unit 21.

The output control unit 102 controls output of distance information acquired by the distance information acquisition unit 101. The output control unit 102 according to the present embodiment performs processing for outputting multiple pieces of distance information in descending order of priority (reliability). The output control unit 102 has a sort processing unit 111.

When multiple pieces of distance information are acquired in a predetermined period, the sort processing unit 111 sets the priority of the distance information such that the larger the difference between the signal level of the reflected waves (direct waves or indirect waves) corresponding to the distance information and a predetermined threshold, the higher the priority. The output control unit 102 outputs the multiple pieces of distance information to the calculation unit 103 in descending order of priority. The predetermined period may be a period (one detection cycle) from transmission of transmitted waves to transmission of the next transmitted waves, for example. The predetermined threshold may be a threshold set for distinguishing an object to be detected (e.g., another vehicle, person, or the like) from an object not to be detected (e.g., road surface or the like), for example.

It can be determined that the larger the difference between the signal level of the reflected waves and the threshold, the higher the reliability of the detected distance information. Hence, by setting the priority (output order) of the multiple pieces of distance information on the basis of the above difference, it is possible to preferentially output highly reliable distance information.

The calculation unit 103 uses the distance information output from the output control unit 102 to perform calculation for generating information regarding objects existing around the vehicle 1. The calculation unit 103 according to the present embodiment has a triangulation calculation unit 121, a velocity information acquisition unit 122, and a prohibition processing unit 123.

The triangulation calculation unit 121 performs triangulation calculation for detecting the location of an object on the basis of first distance information calculated on the basis of the direct waves and second distance information calculated on the basis of the indirect waves. First distance information is the above-mentioned direct TOF or the like. Second distance information is the above-mentioned indirect TOF or the like.

The velocity information acquisition unit 122 acquires first velocity information based on the direct waves and second velocity information based on the indirect waves. First velocity information may be a Doppler shift amount calculated on the basis of the direct waves, a relative velocity calculated on the basis of the Doppler shift amount, or the like. Second velocity information may be a Doppler shift amount calculated on the basis of the indirect waves, a relative velocity calculated on the basis of the Doppler shift amount, or the like.

The prohibition processing unit 123 prohibits the triangulation calculation unit 121 from performing triangulation calculation based on the first distance information and the second distance information when the difference between the first velocity information and the second velocity information exceeds a predetermined range.

If the error between the first velocity information based on the direct waves and the second velocity information based on the indirect waves is large, it is highly possible that the object captured by the direct waves and the object captured by the indirect waves are different. In such a case, the accuracy of the triangulation calculation performed using the first distance information based on the direct waves and the second distance information based on the indirect waves is low. Hence, by performing the processing by the prohibition processing unit 123 as described above, it is possible to curb execution of triangulation calculation with low accuracy.

The object detector 11 according to the present embodiment detects an object by the TOF method using ultrasonic waves. The TOF method is a technique of calculating the distance to an object on the basis of the difference between the timing at which transmitted waves are transmitted (more specifically, when transmission is started) and the timing at which reflected waves are received (more specifically, when reception is started).

Figure 4:
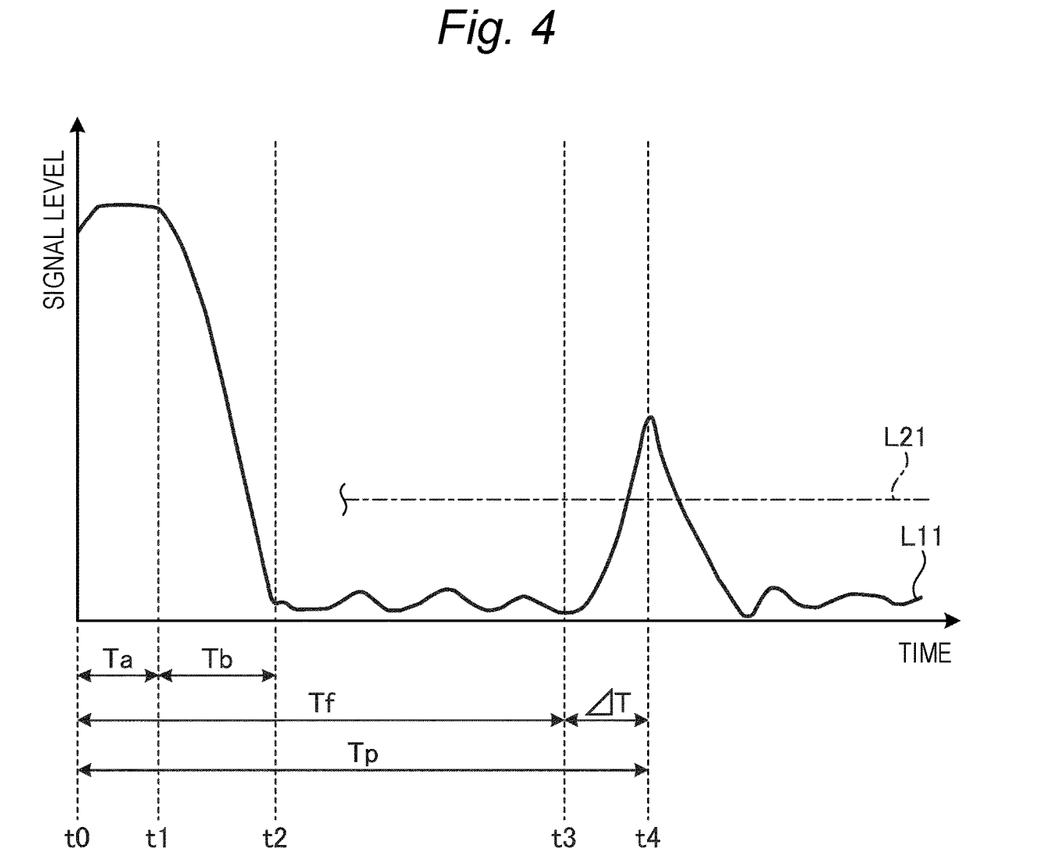
FIG. 4 is a diagram for describing the outline of a TOF method according to the first embodiment.

FIG. 4 is a diagram for describing the outline of the TOF method according to the first embodiment. FIG. 4 shows an envelope indicating the change over time in the signal level of the ultrasonic waves transmitted and received by the transmission and reception unit 21. In the graph shown in FIG. 4, the horizontal axis corresponds to time and the vertical axis corresponds to signal level.

A solid line L11 represents an example of an envelope indicating the change over time in the signal level of the signal transmitted and received by the transmission and reception unit 21, that is, the degree of oscillation of the oscillator 31. From this solid line L11, it can be understood that the oscillator 31 is driven and vibrates for time Ta from timing to, so that transmission of the transmitted waves is completed at timing t1 and then oscillation of the oscillator 31 due to inertia continues while attenuating during time Tb until timing t2. Accordingly, in the graph shown in FIG. 4, time Tb corresponds to the so-called reverberation time.

At timing t4 after passage of time Tp from timing t0 at which transmission of the transmitted waves is started, the solid line L11 reaches its peak where the degree of oscillation of the oscillator 31 exceeds (or becomes equal to or higher than) a predetermined threshold represented by alternate long and short dashed lines L21. This threshold is a value set in advance to identify whether the oscillation of the oscillator 31 is caused by reception of reflected waves from an object to be detected, or is caused by reception of reflected waves from an object not to be detected. Note that while an example is shown in which the threshold represented by the alternate long and short dashed lines L21 is set as a constant value that does not change with the passage of time, the threshold may be set as a value that changes with the passage of time.

Oscillation with a peak exceeding (or equal to or higher than) the threshold represented by the alternate long and short dashed lines L21 can be considered to be caused by reception of reflected waves from an object to be detected. On the other hand, oscillation with a peak equal to or lower than (or below) the threshold can be considered to be caused by reception of reflected waves from an object not to be detected. Accordingly, it can be understood from the solid line L11 that the oscillation of the oscillator 31 at timing t4 is caused by reception of reflected waves from an object to be detected.

Note that on the solid line L11, oscillation of the oscillator 31 attenuates after timing t4. Accordingly, timing t4 corresponds to the timing at which the reception of the reflected waves from the object to be detected is completed, in other words, the timing at which the transmitted waves transmitted last at timing t1 return as reflected waves.

Additionally, on the solid line L11, timing t3 as the start point of the peak at timing t4 corresponds to the timing at which the reception of the reflected waves from the object to be detected starts, in other words, the timing at which the transmitted waves first transmitted at timing t0 return as reflected waves. Accordingly, time ΔT between timing t3 and timing t4 is equal to time Ta as the transmission time of the transmitted waves.

Based on the above, in order to obtain the distance to the object to be detected by the TOF method, it is necessary to obtain time Tf between timing t0 at which transmission of the transmitted waves is started and timing t3 at which reception of the reflected waves is started. This time Tf can be obtained by subtracting time ΔT equal to time Ta as the transmission time of the transmitted waves from time Tp as the difference between timing t0 and timing t4 at which the signal level of the reflected waves reaches the peak exceeding the threshold.

Timing t0 at which transmission of the transmitted waves starts can be easily identified as the timing at which the object detector 11 starts operating, and time Ta as the transmission time of the transmitted waves is predetermined by a setting or the like. Accordingly, it is possible to obtain the distance to the object to be detected by identifying timing t4 at which the signal level of the reflected waves reaches its peak exceeding the threshold.

The distance information acquisition unit 101 according to the present embodiment performs the above processing for each of the direct waves and the indirect waves acquired from each transmission and reception unit 21, and acquires direct TOF (first distance information) based on the direct waves and indirect TOF (second distance information) based on the indirect waves. Then, when multiple TOFs (direct TOFs or indirect TOFs) are acquired in a predetermined period, the sort processing unit 111 according to the present embodiment sets the priority of the TOFs such that the larger the difference between the signal level corresponding to the TOF and the threshold, the higher the priority. Then, the output control unit 102 according to the present embodiment outputs the multiple TOFs to the calculation unit 103 in descending order of the set priority.

Figure 5:
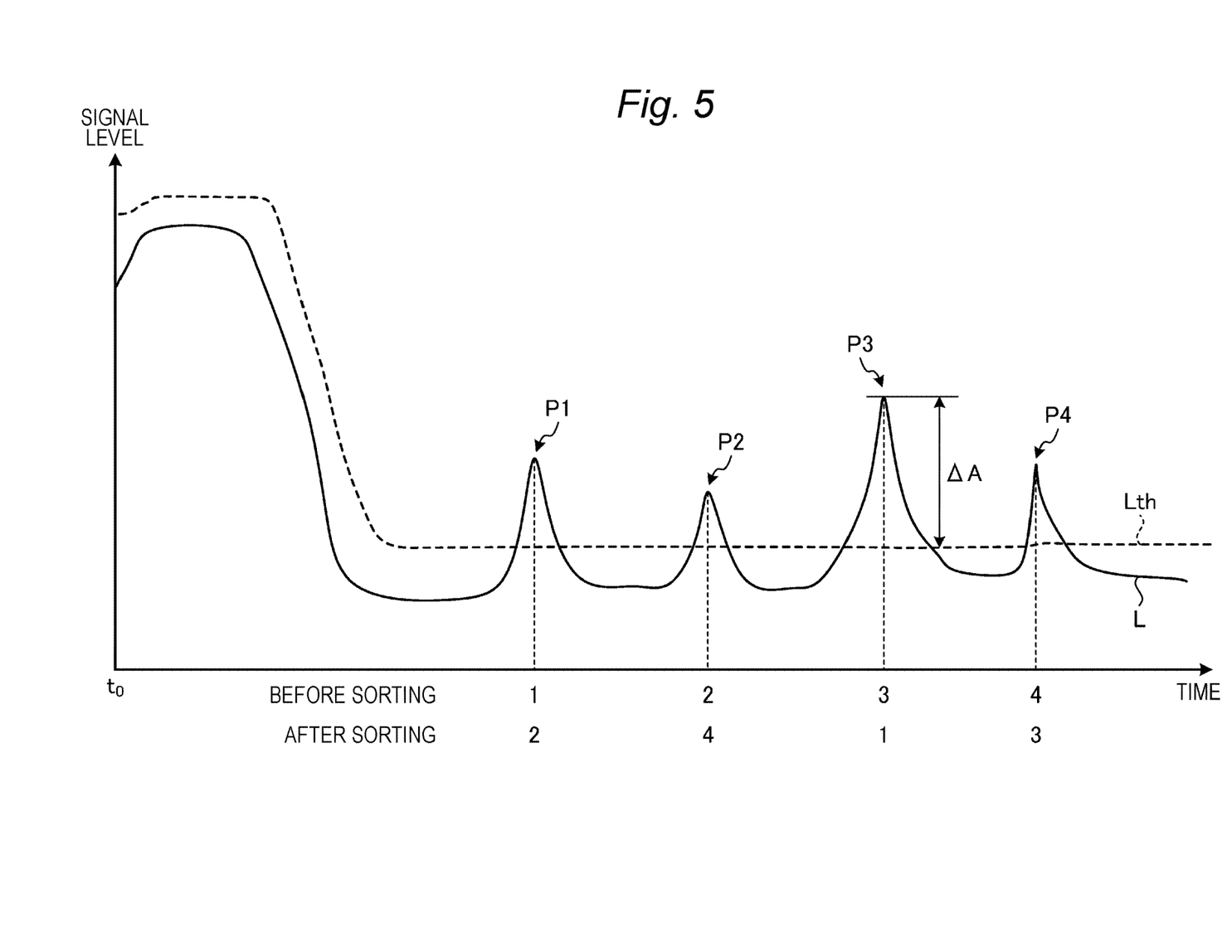
FIG. 5 is a diagram showing an example of processing by a sort processing unit according to the first embodiment.

FIG. 5 is a diagram showing an example of processing by the sort processing unit 111 according to the first embodiment. FIG. 5 shows an envelope L indicating the change over time in the signal level of reflected waves (direct waves or indirect waves) in one detection cycle, and a threshold line Lth indicating a threshold for detecting TOF (direct TOF or indirect TOF). FIG. 5 shows an example in which four peaks P1 to P4 corresponding to four TOFs TOF1 to TOF4 are detected in one detection cycle.

As shown in FIG. 5, the priority of TOF1 to TOF4 before sorting is set in ascending order of elapsed time from timing t0 of transmission of the transmitted waves until detection of the corresponding peaks P1 to P4, that is, determined on the basis of the detection time of the peaks P1 to P4. In this case, the four TOFs TOF1 to TOF4 are output to the calculation unit 103 in the order of TOF1→TOF2→TOF3→TOF4.

On the other hand, the priority of TOF1 to TOF4 after sorting is set in descending order of a difference ΔA between the signal level of each peak P1 to P4 on the envelope L and the threshold represented by the threshold line Lth. In this case, the four TOFs TOF1 to TOF4 are output to the calculation unit 103 in the order of TOF3→TOF1→TOF4→TOF2.

It can be determined that the larger the difference ΔA, the higher the possibility that the detected peak corresponds to an object to be detected (the lower the possibility that it is caused by noise such as road surface clutter). Hence, by setting the priority (output order) of TOF1 to TOF4 on the basis of the difference ΔA as described above, it is possible to preferentially output highly reliable TOF to the calculation unit 103.

Figure 6:
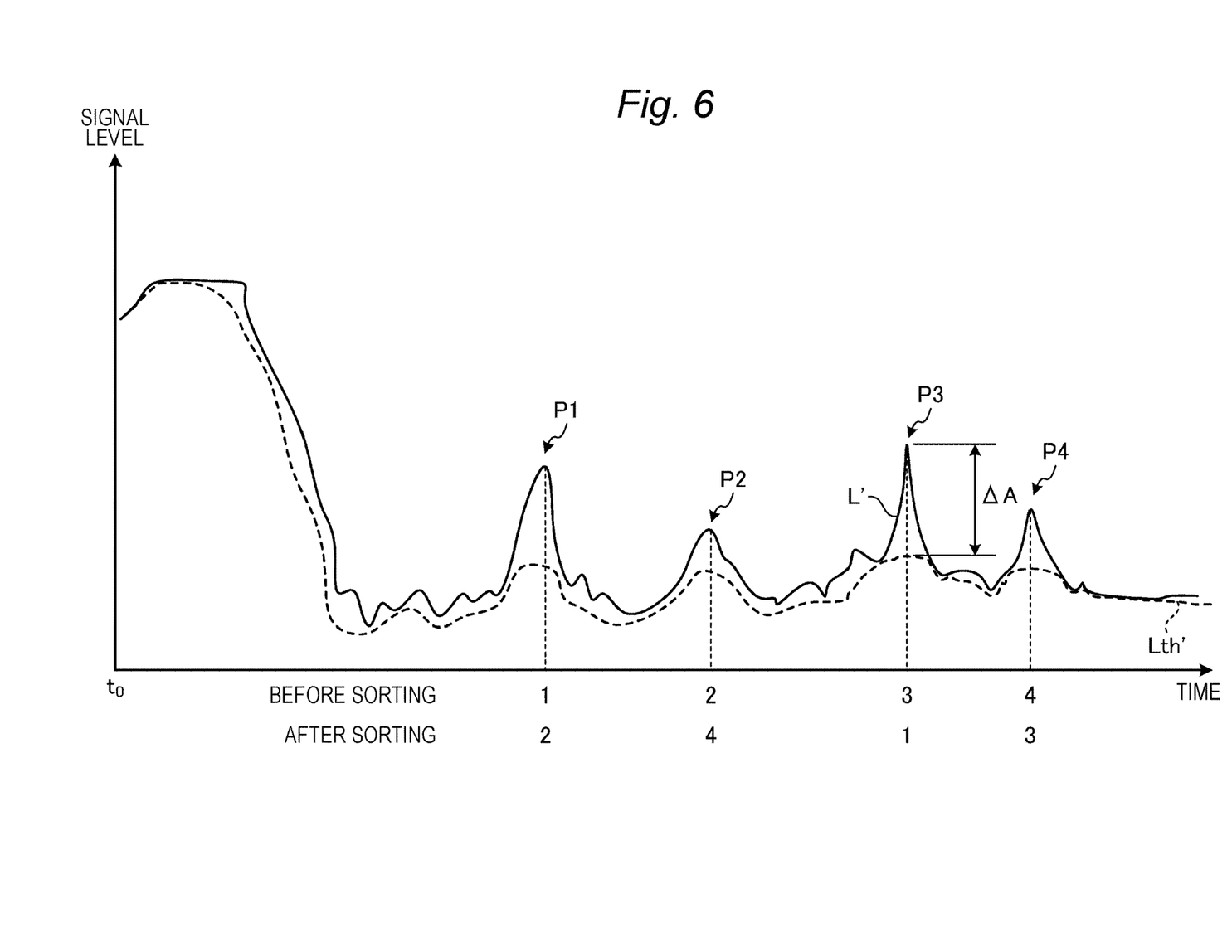
FIG. 6 is a diagram showing another example of processing by the sort processing unit according to the first embodiment.

FIG. 6 is a diagram showing another example of processing by the sort processing unit 111 according to the first embodiment. FIG. 6 shows an envelope L' indicating the change over time in the signal level of reflected waves (direct waves or indirect waves) in one detection cycle, and a threshold line Lth' indicating a threshold for detecting TOF (direct TOF or indirect TOF). The threshold line Lth' in the example shown in FIG. 6 is a processing value using the moving average value of the envelope L'. The processing value may be any value that can detect the TOF corresponding to the object to be detected. For example, a value obtained by adding or subtracting a threshold based on a predetermined standard (e.g., threshold for removing road surface clutter) from the moving average value may be used. The method of setting the priority of TOF1 to TOF4 (peaks P1 to P4) is similar to that of the example shown in FIG. 5. In this way, by setting the threshold for detecting TOF to the processing value using the moving average value, it is possible to improve the effect of removing noise such as road surface clutter.

Figure 7:
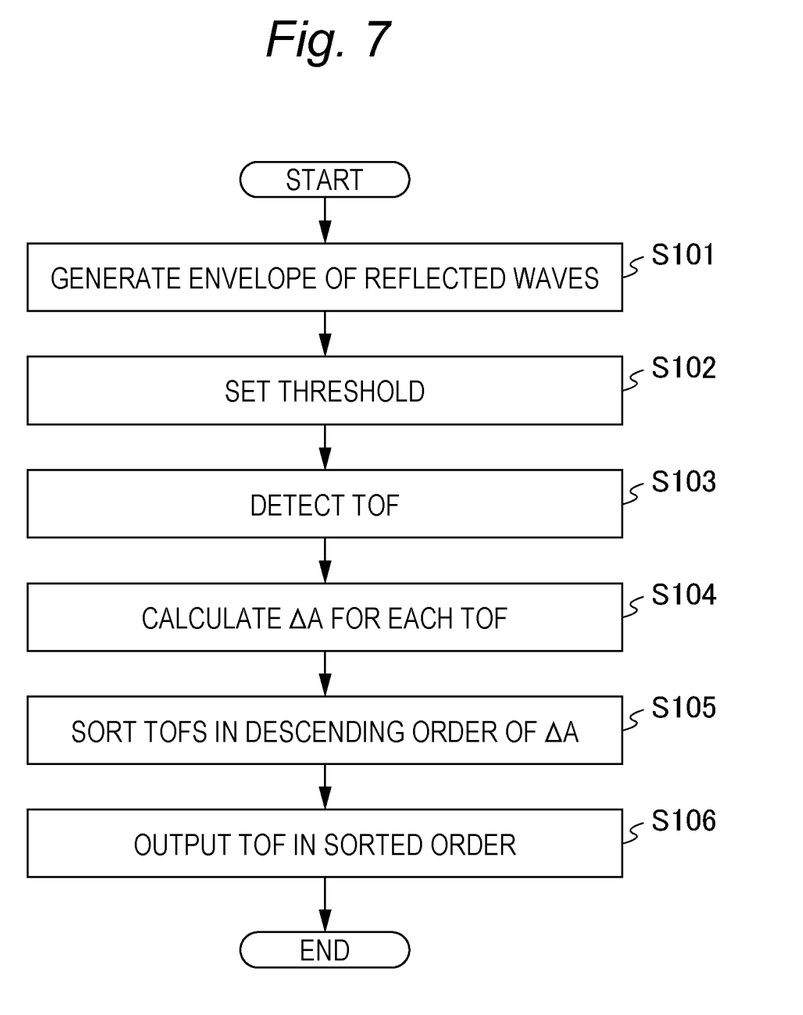
FIG. 7 is a flowchart showing an example of processing by a distance information acquisition unit and an output control unit according to the first embodiment.

FIG. 7 is a flowchart showing an example of processing by the distance information acquisition unit 101 and the output control unit 102 according to the first embodiment. The distance information acquisition unit 101 generates an envelope of reflected waves (direct waves and/or indirect waves) received by the transmission and reception unit 21 (S101), and sets a threshold for detecting TOF (S102). At this time, the distance information acquisition unit 101 may generate an envelope and set a threshold on the basis of data subjected to constant false alarm rate (CFAR) processing. CFAR processing is processing of acquiring a difference signal obtained by subtracting the moving average value from the signal level of the reflected waves to be processed. By using CFAR processing, the influence of noise such as road surface clutter can be reduced. Thereafter, the distance information acquisition unit 101 detects TOF from reflected waves at the signal level exceeding the threshold (S103).

The sort processing unit 111 of the output control unit 102 calculates the above difference ΔA (difference between signal level of each peak P1 to P4 and threshold represented by threshold lines Lth and Lth') for each detected TOF (S104), and sorts the multiple TOFs in descending order of the difference ΔA (S105). The output control unit 102 outputs the multiple TOFs to the calculation unit 103 in the sorted order (S106).

By the above processing, it is possible to preferentially output highly reliable TOF to the calculation unit 103.

The triangulation calculation unit 121 of the calculation unit 103 performs triangulation calculation for detecting the location of an object on the basis of the sorted distance information output from the output control unit 102 as described above, that is, the first distance information (direct TOF) and the second distance information (indirect TOF) having high priority (reliability). Additionally, the velocity information acquisition unit 122 acquires the first velocity information (Doppler shift amount or relative velocity) based on the first distance information and the second velocity information (Doppler shift amount or relative velocity) based on the second distance information. Additionally, the prohibition processing unit 123 prohibits execution of the triangulation calculation based on the first distance information and the second distance information when the difference between the first velocity information and the second velocity information exceeds a predetermined range.

Figure 8:
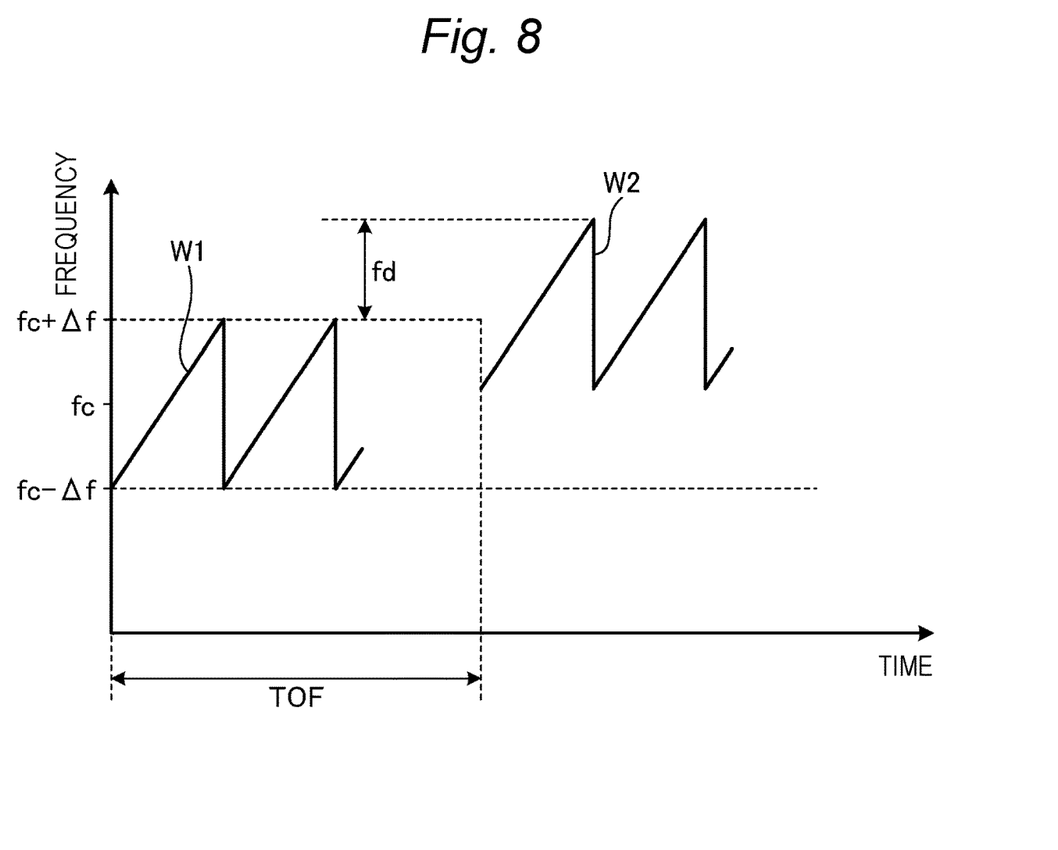
FIG. 8 is a diagram showing an example of a Doppler shift generated between transmitted waves transmitted from a transmission and reception unit according to the first embodiment and reflected waves from an object.

Here, the Doppler shift will be described. FIG. 8 is a diagram showing an example of a Doppler shift generated between transmitted waves transmitted from the transmission and reception unit 21 according to the first embodiment and reflected waves from an object. FIG. 8 illustrates a case where frequency modulation is applied so that the frequency of the transmitted waves changes in a sawtooth shape. In FIG. 8, the horizontal axis corresponds to time, and the vertical axis corresponds to the frequency of transmitted waves and reflected waves.

Waveform W1 shows the frequency characteristic of the transmitted waves, and waveform W2 shows the frequency characteristic of the reflected waves. The waveform W1 of the transmitted waves is a waveform corresponding to a chirp signal whose instantaneous frequency changes in the range of fc−Δf to fc+Δf.

When the relative distance between the object and the transmission and reception unit 21 is decreasing (when vehicle 1 and/or object are moving so as to approach each other), the frequency band of the received waves indicated by the waveform W2 shifts to the high frequency side from the frequency band of the transmitted waves indicated by the waveform W1 due to the Doppler effect. At this time, although there is a difference in the frequency band between the waveform W1 and the waveform W2, a common waveform characteristic in which the frequency changes in a sawtooth shape with the passage of time appears. Accordingly, by extracting a signal having a similar waveform characteristic as the waveform W1 from the signal acquired after the transmission of the transmitted waves, the waveform W2 of the reflected waves corresponding to the transmitted waves can be identified. Note that when the relative distance is increasing (when vehicle 1 and/or object are moving away from each other), the frequency band indicated by the waveform W2 shifts to the low frequency side from the frequency band indicated by the waveform W1.

By identifying the correspondence between the waveform W1 and the waveform W2 as described above, TOF corresponding to the distance to the object and a Doppler shift amount (frequency difference) fd generated between the transmitted waves and the reflected waves can be acquired. Then, the relative velocity of the object with respect to the vehicle 1 (transmission and reception unit 21) can be calculated on the basis of the Doppler shift amount fd.

Figure 9:
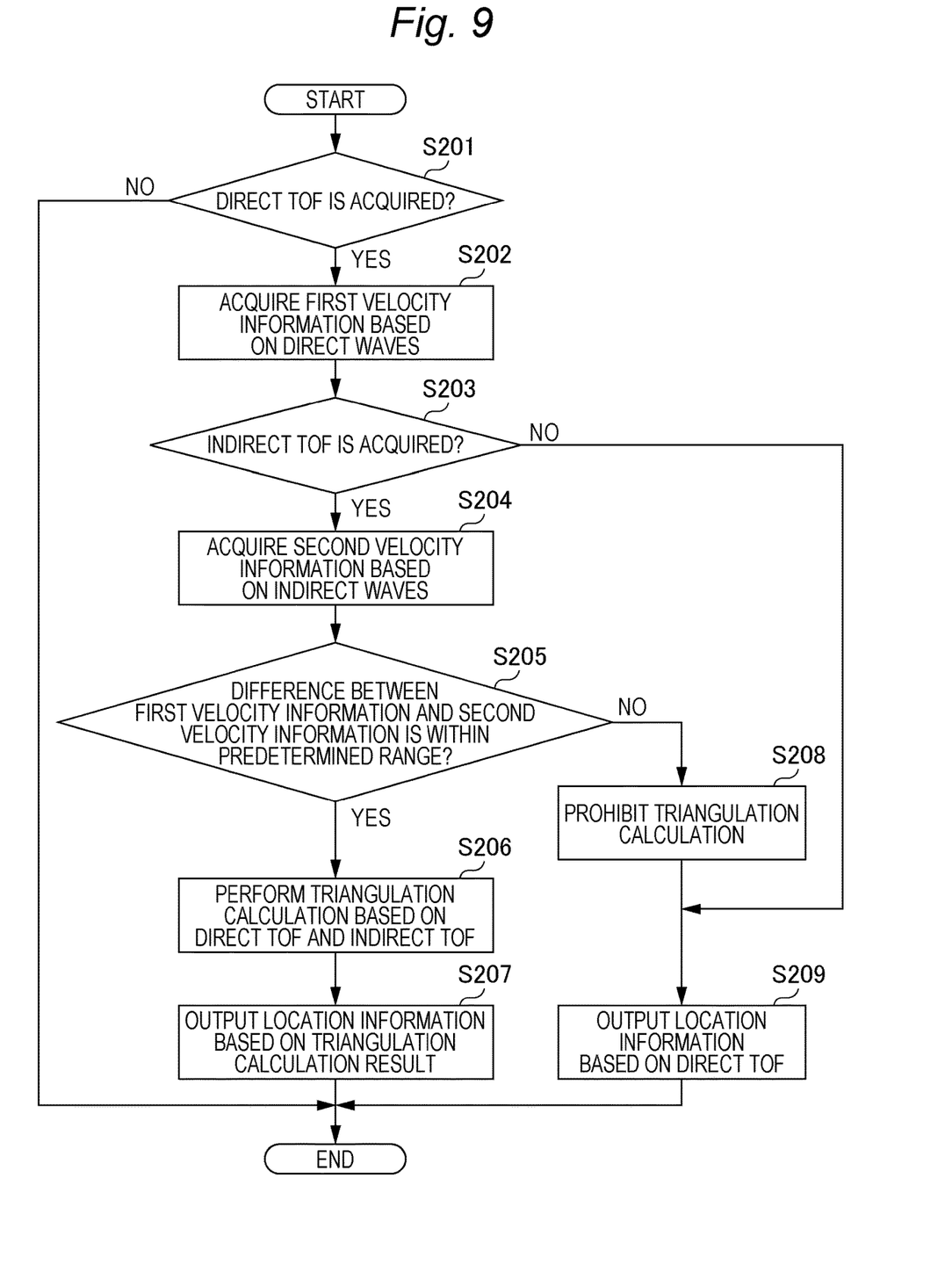
FIG. 9 is a flowchart showing an example of processing by a calculation unit according to the present embodiment.

FIG. 9 is a flowchart showing an example of processing by the calculation unit 103 according to the present embodiment. First, the velocity information acquisition unit 122 determines whether or not direct TOF (first distance information) is acquired from the output control unit 102 (S201), and if direct TOF is not acquired (S201: No), this routine is ended. On the other hand, if direct TOF is acquired (S201: Yes), the velocity information acquisition unit 122 acquires the first velocity information (Doppler shift amount or relative velocity) based on direct waves (S202).

Thereafter, the velocity information acquisition unit 122 determines whether or not indirect TOF (second distance information) is acquired from the output control unit 102 (S203), and if indirect TOF is not acquired (S203: No), the calculation unit 103 outputs location information generated using only the direct TOF to the ECU 12 (S209). On the other hand, if indirect TOF is acquired (S203: Yes), the velocity information acquisition unit 122 acquires the second velocity information (Doppler shift amount or relative velocity) based on indirect waves (S204).

The prohibition processing unit 123 determines whether or not the difference between the first velocity information and the second velocity information is within a predetermined range (S205), and if the difference is not within the predetermined range (S205: No), prohibits triangulation calculation by the triangulation calculation unit 121 (S208). In this case, the calculation unit 103 outputs location information generated using only the direct TOF to the ECU 12 (S209). On the other hand, if the difference between the first velocity information and the second velocity information is within the predetermined range (S205: Yes), the triangulation calculation unit 121 performs triangulation calculation based on the direct TOF and the indirect TOF (S206), and the calculation unit 102 outputs location information based on the triangulation calculation result to the ECU 12 (S207).

According to the above processing, when the error between the first velocity information and the second velocity information is large, triangulation calculation based on the first distance information (direct TOF) and the second distance information (indirect TOF) Is prohibited. This makes it possible to curb execution of triangulation calculation with low accuracy.

A program that causes the processor 43 or the like to perform processing for implementing the various functions of the above embodiment can be provided as a file in an installable format or an executable format recorded on a computer-readable recording medium such as a compact disc read-only memory (CD-ROM), a flexible disc (FD), a compact disc recordable (CD-R), or a digital versatile disk (DVD). Additionally, the program may be provided or distributed through a network such as the Internet.

According to the above embodiment, it is possible to improve the detection accuracy of an object.

Hereinafter, while another embodiment will be described with reference to the drawing, the same reference numerals may be assigned to parts that exhibit the same or similar effects as those of the first embodiment, and the description thereof may be omitted.

Second Embodiment

Figure 10:
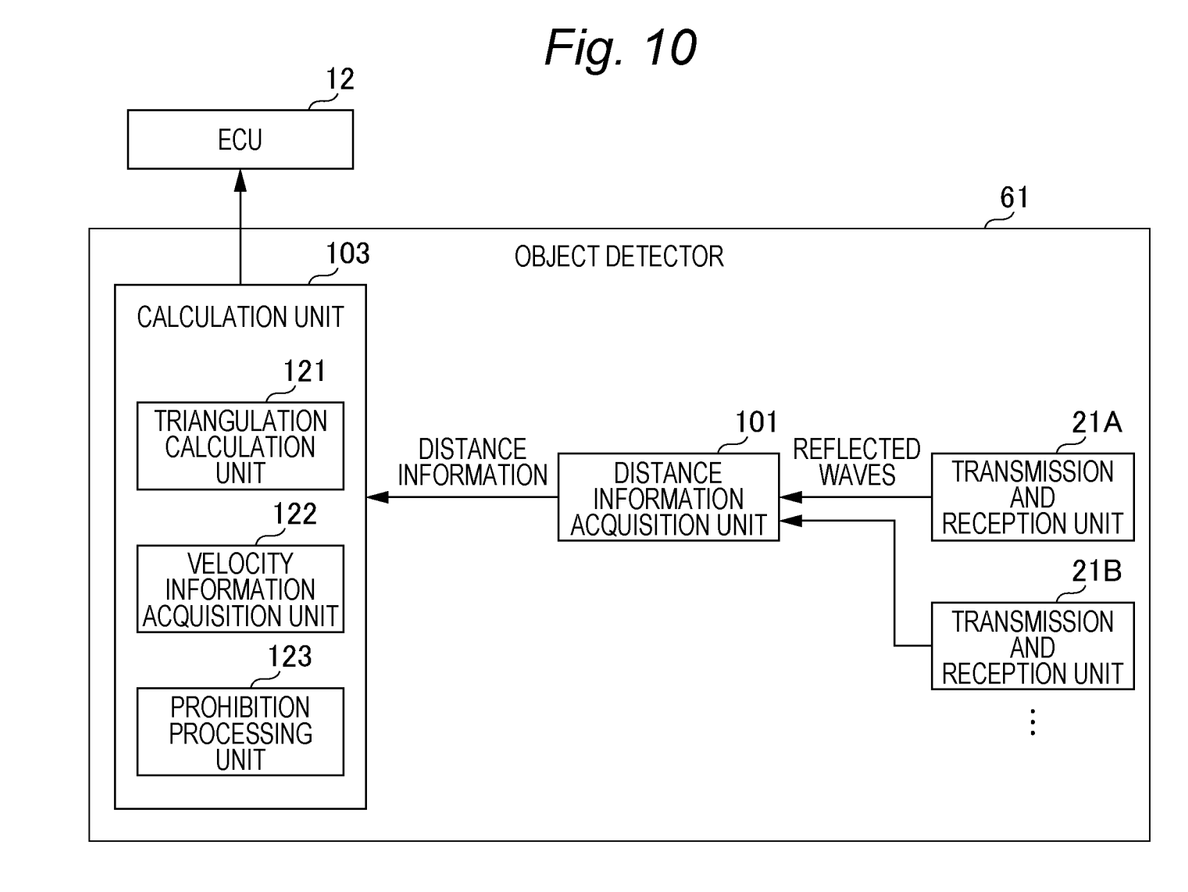
FIG. 10 is a block diagram showing an example of the functional configuration of an object detector according to a second embodiment.

FIG. 10 is a block diagram showing an example of the functional configuration of an object detector 61 according to a second embodiment. The object detector 61 according to the present embodiment is different from the object detector 11 according to the first embodiment in that it does not have the output control unit 102 and the sort processing unit 111 described above.

In the present embodiment, multiple pieces of first distance information (direct TOF) or multiple pieces of second distance information (indirect TOF) acquired by a distance information acquisition unit 101 are output to a calculation unit 103 with no priority set therefor. For example, the first distance information or the second distance information according to the present embodiment may be output in the order before sorting shown in FIG. 5 or 6 (order based on time when peak corresponding to TOF is detected).

Even with the above configuration, the above-described action of a prohibition processing unit 123 can improve the accuracy of triangulation calculation, and an object can be detected with high accuracy.

An object detector as an example of this disclosure includes: a triangulation calculation unit that performs triangulation calculation for detecting a location of an object on the basis of first distance information calculated on the basis of direct waves in which transmitted waves transmitted from a first transmission and reception unit are reflected by an object and received by the first transmission and reception unit, and second distance information calculated on the basis of indirect waves in which transmitted waves transmitted from a second transmission and reception unit arranged in a location different from the first transmission and reception unit are reflected by an object and received by the first transmission and reception unit; and a prohibition processing unit that prohibits the triangulation calculation when a difference between first velocity information indicating a velocity of an object calculated on the basis of the direct waves and second velocity information indicating a velocity of an object calculated on the basis of the indirect waves exceeds a predetermined range.

According to the above configuration, when the difference between the first velocity information based on the direct waves and the second velocity information based on the indirect waves is large, triangulation calculation based on the first distance information based on the direct waves and the second distance information based on the indirect waves is not performed. As a result, since triangulation calculation can be performed using only the highly reliable distance information, it is possible to curb detection of virtual images and improve the detection accuracy of an object.

Additionally, in the above object detector, the first velocity information may be a Doppler shift amount calculated on the basis of the direct waves, and the second velocity information may be a Doppler shift amount calculated on the basis of the indirect waves.

Additionally, in the above object detector, the first velocity information may be a relative velocity based on the Doppler shift amount calculated on the basis of the direct waves, and the second velocity information may be a relative velocity based on the Doppler shift amount calculated on the basis of the indirect waves.

Additionally, the above object detector may further include: an acquisition unit that acquires first distance information or second distance information by detecting direct waves or indirect waves at a signal level exceeding a threshold; a sort processing unit that, when a plurality of pieces of first distance information or second distance information are acquired in a predetermined period, sets a priority of the first distance information or the second distance information such that the larger a difference between a signal level corresponding to the first distance information or the second distance information and the threshold, the higher the priority; and an output control unit that outputs the multiple pieces of first distance information or second distance information in descending order of priority.

It can be determined that the larger the difference between the signal level corresponding to the first distance information or the second distance information and the threshold, the higher the reliability of the first distance information or the second distance information. Hence, according to the above configuration, it is possible to perform triangulation calculation by preferentially using the first distance information or the second distance information having high reliability.

While embodiments of this disclosure have been described above, the above-described embodiments are merely examples, and are not intended to limit the scope of this disclosure. The novel embodiments described above can be implemented in various forms, and various omissions, replacements, and changes can be made without departing from the gist of this disclosure. The above-described embodiments are included in the scope and gist of this disclosure, as well as in the scope of this disclosure described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An object detector comprising:
a triangulation calculation unit that performs triangulation calculation for detecting a location of an object on the basis of first distance information calculated on the basis of direct waves in which transmitted waves transmitted from a first transmission and reception unit are reflected by an object and received by the first transmission and reception unit, and second distance information calculated on the basis of indirect waves in which transmitted waves transmitted from a second transmission and reception unit arranged in a location different from the first transmission and reception unit are reflected by an object and received by the first transmission and reception unit;
a velocity information acquisition unit that calculates first velocity information indicating a velocity or relative velocity of an object calculated on the basis of the direct waves and second velocity information indicating a velocity or relative velocity of an object calculated on the basis of the indirect waves; and
a prohibition processing unit that prohibits the triangulation calculation when a difference between the first velocity information and the second velocity information exceeds a predetermined value.

2. The object detector according to claim 1, wherein
the first velocity information is a Doppler shift amount calculated on the basis of the direct waves, and
the second velocity information is a Doppler shift amount calculated on the basis of the indirect waves.

3. The object detector according to claim 1, wherein
the first velocity information is a relative velocity based on a Doppler shift amount calculated on the basis of the direct waves, and
the second velocity information is a relative velocity based on a Doppler shift amount calculated on the basis of the indirect waves.

4. The object detector according to claim 1 further comprising:
an acquisition unit that acquires the first distance information or the second distance information by detecting the direct waves or the indirect waves at a signal level exceeding a threshold;
a sort processing unit that, when a plurality of pieces of the first distance information or the second distance information are acquired in a predetermined period, sets a priority of the first distance information or the second distance information such that the larger a difference between a signal level corresponding to the first distance information or the second distance information and the threshold, the higher the priority; and
an output control unit that outputs the plurality of pieces of the first distance information or the second distance information in descending order of the priority.

\* \* \* \* \*